US012602221B2

(12) United States Patent
Yamada et al.

(10) Patent No.: US 12,602,221 B2
(45) Date of Patent: Apr. 14, 2026

(54) SOFTWARE COMPONENT UPDATE SYSTEM, AND SOFTWARE COMPONENT UPDATE METHOD

(71) Applicant: Hitachi Astemo, Ltd., Hitachinaka (JP)

(72) Inventors: Miki Yamada, Ibaraki (JP); Takafumi Suzuki, Ibaraki (JP); Takashi Matsubara, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 190 days.

(21) Appl. No.: 18/550,882

(22) PCT Filed: Jan. 25, 2022

(86) PCT No.: PCT/JP2022/002693
§ 371 (c)(1),
(2) Date: Sep. 15, 2023

(87) PCT Pub. No.: WO2023/076212
PCT Pub. Date: Jan. 5, 2023

(65) Prior Publication Data
US 2024/0086179 A1 Mar. 14, 2024

(30) Foreign Application Priority Data
Jun. 28, 2021 (JP) ................................. 2021-106330

(51) Int. Cl.
*G06F 9/445* (2018.01)
*G06F 8/36* (2018.01)
*G06F 8/65* (2018.01)

(52) U.S. Cl.
CPC . *G06F 8/65* (2013.01); *G06F 8/36* (2013.01)

(58) Field of Classification Search
CPC ..... G06F 8/65; G06F 8/36; G06F 8/71; G06F 8/61; G06F 8/658; G06F 8/433; G06F 16/9014; G06F 3/123; G06F 16/23
See application file for complete search history.

(56) References Cited

U.S. PATENT DOCUMENTS

| | | | |
|---|---|---|---|
| 11,294,665 B1* | 4/2022 | Foster | G06F 8/71 |
| 2007/0088740 A1* | 4/2007 | Davies | G06F 9/4488 |
| 2008/0168135 A1* | 7/2008 | Redlich | G06F 16/282 709/204 |
| 2011/0055153 A1 | 3/2011 | Hashimoto et al. | |

FOREIGN PATENT DOCUMENTS

JP 2010-033373 A 2/2010

* cited by examiner

*Primary Examiner* — Chuck O Kendall
(74) *Attorney, Agent, or Firm* — Foley & Lardner LLP

(57) ABSTRACT

A software component update system is connected to a first database and a second database and includes a component tree rebuilding unit that rebuilds a software component tree of the second database on the basis of tag information and software component tree information of the first database; a component extraction unit that specifies the software components of the second database requiring update mirroring, on the basis of the rebuilt software component tree; and a file update unit that updates the software component file of the specified software components.

6 Claims, 4 Drawing Sheets

| TAG TYPE | TARGET ASSET | TAG |
|---|---|---|
| SELECTION TAG | – | Variant-A1, Varitant-B4, ··· |
| NON-SHARING TAG | ASSET A | Variant-A3, *_private, ··· |

510

500

DIFFERENCE INFORMATION (ASSET A → ASSET B)     X

SOFTWARE COMPONENT TREE

T1

511     T2     T3     513     T6

512     T4

FILE

| Status | Filename |
|---|---|
| Modified | featureX.txt |
| Modified | featureX.c |
| Add | featureZ.txt |
| Add | featureZ.c |

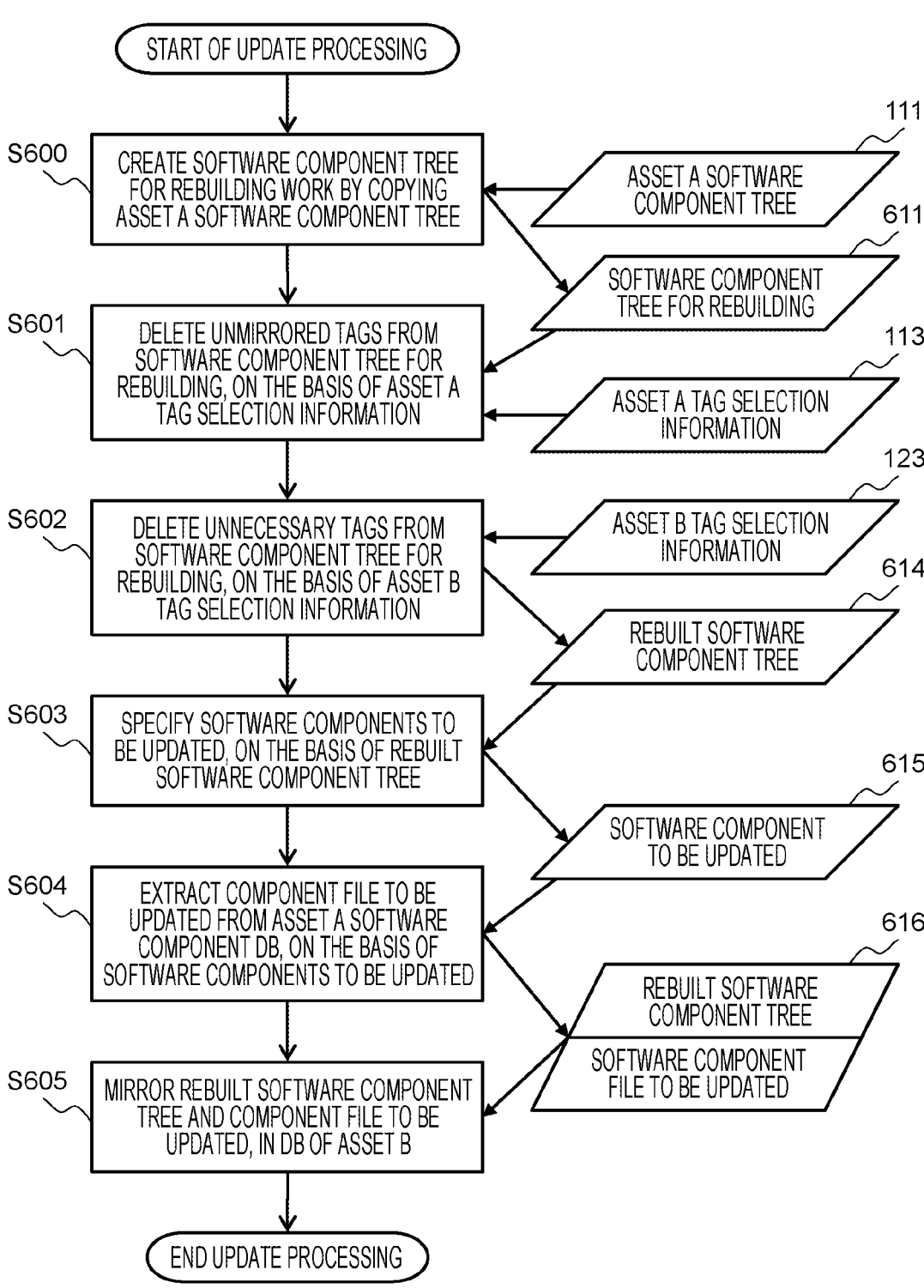

START OF UPDATE PROCESSING

S600 — CREATE SOFTWARE COMPONENT TREE FOR REBUILDING WORK BY COPYING ASSET A SOFTWARE COMPONENT TREE

111 — ASSET A SOFTWARE COMPONENT TREE

611 — SOFTWARE COMPONENT TREE FOR REBUILDING

S601 — DELETE UNMIRRORED TAGS FROM SOFTWARE COMPONENT TREE FOR REBUILDING, ON THE BASIS OF ASSET A TAG SELECTION INFORMATION

113 — ASSET A TAG SELECTION INFORMATION

S602 — DELETE UNNECESSARY TAGS FROM SOFTWARE COMPONENT TREE FOR REBUILDING, ON THE BASIS OF ASSET B TAG SELECTION INFORMATION

123 — ASSET B TAG SELECTION INFORMATION

614 — REBUILT SOFTWARE COMPONENT TREE

S603 — SPECIFY SOFTWARE COMPONENTS TO BE UPDATED, ON THE BASIS OF REBUILT SOFTWARE COMPONENT TREE

615 — SOFTWARE COMPONENT TO BE UPDATED

S604 — EXTRACT COMPONENT FILE TO BE UPDATED FROM ASSET A SOFTWARE COMPONENT DB, ON THE BASIS OF SOFTWARE COMPONENTS TO BE UPDATED

616 — REBUILT SOFTWARE COMPONENT TREE / SOFTWARE COMPONENT FILE TO BE UPDATED

S605 — MIRROR REBUILT SOFTWARE COMPONENT TREE AND COMPONENT FILE TO BE UPDATED, IN DB OF ASSET B

END UPDATE PROCESSING

SOFTWARE COMPONENT UPDATE SYSTEM, AND SOFTWARE COMPONENT UPDATE METHOD

INCORPORATED HEREIN BY REFERENCE

This application claims priority to JP 2021-106330 A filed on Jun. 28, 2021, the contents of which are incorporated herein by reference.

TECHNICAL FIELD

The present invention relates to a software component database that stores software components constituting software and product group configuration management.

BACKGROUND ART

In recent years, as a method of efficiently developing a new software product, a development technique of combining and re-using required software components from existing software components has often been used.

As a method of managing software components, there is a method that involves building and managing a tree model in which software variability and software components are associated with each other. In this specification, this model is referred to as a software component tree. A software component tree has a plurality of nodes representing variations of software components.

In a case where a new product is to be developed, a developer can select a node suitable for the new product from a software component tree and efficiently select and extract software components which can be reused by the product. In this management method, in cases where software components are to be developed in parallel in a plurality of projects, it is necessary to mirror update information of the files constituting the software components in other projects and software products. However, there is a problem that such work requires a large number of man-hours.

The background art of this technical field includes the following prior art. PTL 1 (JP 2010-33373 A) includes a software component database and a software product management unit, and accepts data transmission/reception from a software component database management client and a software product operation client. PTL 1 discloses a software configuration management system that includes a component-product correspondence table; component-file correspondence information; a synchronization unit for mutually mirroring changes in a software component database and changes in software products; update information; and a correspondence table update unit (see Abstract). According to the technology disclosed in PTL 1, update information of software components managed by the software component database can be efficiently mirrored in a product group.

SUMMARY OF INVENTION

Technical Problem

In a large-scale development project, in addition to software components that can be reused in a plurality of projects, there is also software component groups that can be reused only in a product of a specific project. Hereinafter, in the present application, a software component group that can be reused in a plurality of projects is referred to as a core asset, and a software component group that can be reused only in a product of a specific project is referred to as a project-specific component group.

PTL 1 proposes a method of managing software component groups corresponding to core assets, but it is also necessary, for project-specific component groups, to perform configuration management using a software component tree, and perform the work of mirroring update information. Project-specific component groups include groups that cannot be shared with other projects for reasons such as security requirements and rights ownership.

In project development, software component groups reused from a core asset and project-specific component groups are updated or newly added. In a project, it is necessary to collectively manage software component groups used in project development, and the software component groups managed in the project are referred to as project assets. When a project asset is updated as a result of project development, appropriately mirroring update information in a database of core assets or project product groups according to the sharing ranges of the software components has been problematic.

However, PTL 1 does not disclose a method of mirroring updates to software components, which are stored in the databases of a plurality of projects, in databases of other projects and products according to the sharing ranges.

Furthermore, in order to maintain the relationships of the software component groups included in each asset, it is necessary to manage the configuration of the software components by using a software component tree for each asset. For example, a software component tree of a core asset is required in order to extract, from the core asset, a software component group required for a project. In addition, a software component tree of a project asset is required in order to extract a software component group required for a product from a project asset.

In a case where a software component is newly added due to the development of each asset, it is necessary to check for differences between software component trees and to mirror update information in other software component trees depending on re-usage requirements, and this mirroring work requires a huge number of man-hours. However, PTL 1 does not disclose a method of managing a plurality of software component trees and mutually mirroring update information.

The present invention was conceived in view of the above problems, and it is an object of the present invention to update a software component tree of another project or product group according to a sharing range of a software component and to mirror update information of the software component in a database of another project or product group, even in a case where software components having different sharing ranges are being developed in a plurality of projects.

Solution to Problem

A representative example of the invention disclosed in the present application is as follows. That is, a software component update system configured by a computer including a processor and a memory and connected to a first database and a second database that store software component tree information representing a plurality of software components in a tree format, tag information representing respective attributes of the software components, and a software component file including design information and a source code that constitute the software components, the software component update system including: a component tree rebuilding unit that rebuilds a software component tree of the second database on the basis of the tag information and the software component tree information of the first database; a component extraction unit that specifies the software components of the second database requiring update mirroring, on the basis of the rebuilt software component tree; and a file update unit that updates the software component file of the specified software components.

Advantageous Effects of Invention

According to one aspect of the present invention, even in a case where there are software components having different sharing ranges, update information of the software components can be mirrored in a database of another project or product group according to the sharing ranges of the software components. Problems, configurations, advantageous effects, and the like other than those described above will be clarified by the following descriptions of the embodiments.

BRIEF DESCRIPTION OF DRAWINGS

FIG. 6 is a flowchart of processing executed by the software component update system according to the first embodiment.

DESCRIPTION OF EMBODIMENTS

Hereinafter, embodiments will be described in detail with reference to the drawings.

First Embodiment

Figure 1:
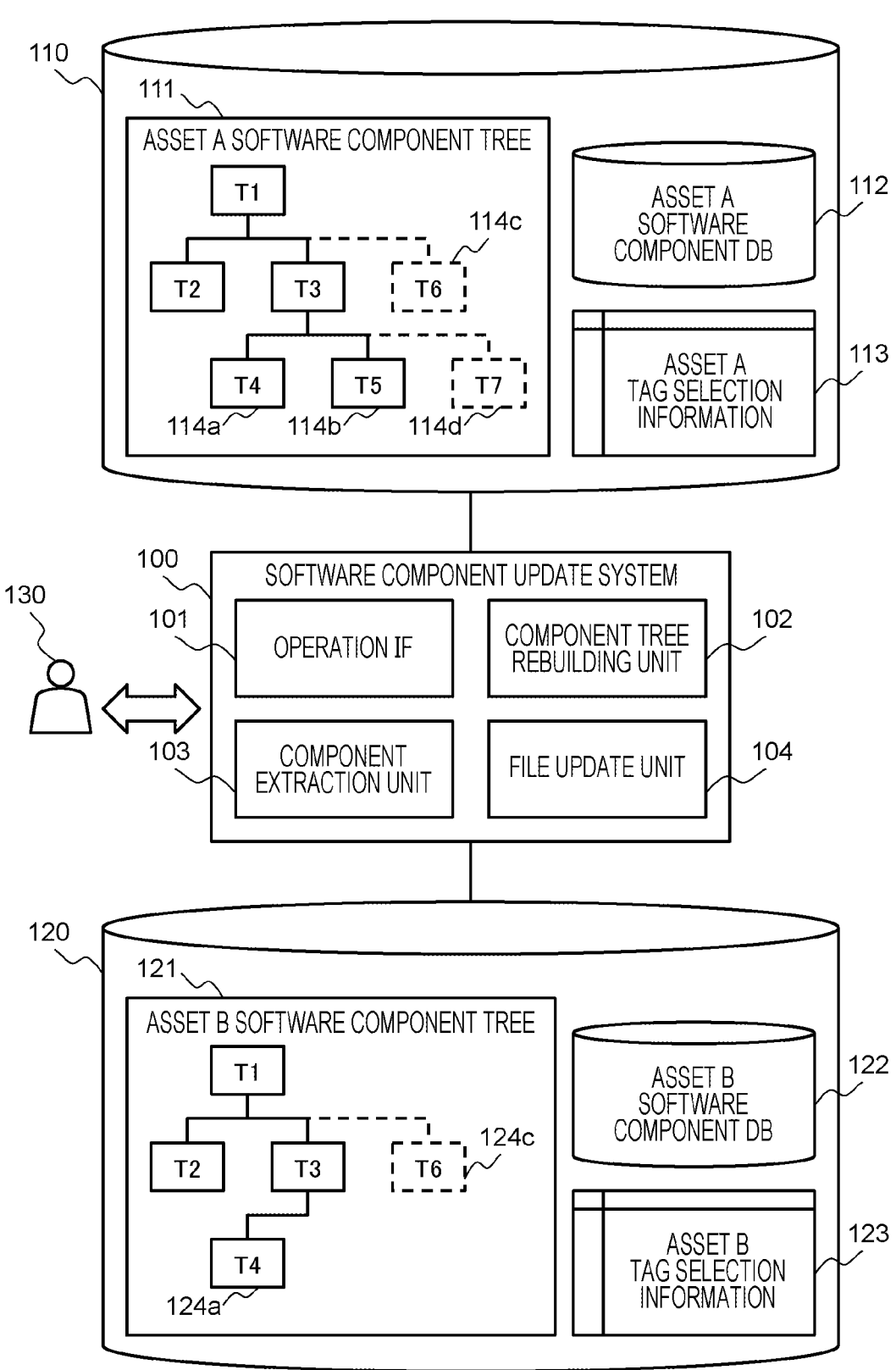
FIG. 1 is a diagram illustrating a configuration example of a software component update system according to a first embodiment.

FIG. 1 is a diagram illustrating a configuration example of a software component update system 100 according to a first embodiment.

In the present embodiment, when a software component tree 111 included in an asset A database 110 and software components included in the asset A database 110 are updated, the software component update system 100 of the present invention is able to rebuild an asset B software component tree 121 on the basis of the asset A software component tree 111 and asset B tag selection information 123, to specify a software component group requiring update mirroring, on the basis of the rebuilt software component tree, and to mirror update information of the software components included in the asset A database 110 in the asset B software component database 122 included in the asset B database 120.

The software component update system 100 includes an operation interface 101, a component tree rebuilding unit 102, a component extraction unit 103, and a file update unit 104. Details of a hardware configuration of the software component update system 100 will be described below with reference to FIG. 2.

The asset A database 110 and the asset B database 120 are asset databases that store information pertaining to arbitrary software component groups. Examples of the software component groups stored in the asset databases 110 and 120 include core assets, which are software component groups that can be reused in a plurality of projects, project assets, which are software component groups that can be reused in a specific project, and software component groups constituting a specific product, as indicated by the "Technical Problem" above.

Each of the asset databases 110 and 120 stores software component trees 111 and 121 for each asset representing, in a tree format, the configuration of software components to be managed, software component databases 112 and 122 for each asset that store a software component file including design information and a source code that constitute the software components to be managed, and tag selection information 113 and 123 of each asset for specifying the software components to be managed.

The software component trees 111 and 121 have, as nodes constituting the trees, tag information items 114a to 114d, 124a, and 124c representing attributes such as features of the software components included in the asset databases 110 and 120.

Note that, regarding the reference signs of the tag information items of each asset, a reference sign "114" or "124" from which the suffix is omitted is used in cases where individual information items are not specified. The same applies to the reference signs of other constituent elements.

The tag information items 114 and 124 record, for example, function names of software components, specific product names, security requirement information, functional safety response information, information regarding rights attribution, and information indicating further versatility.

Furthermore, as will be described below, the software component trees 111 and 121 for each asset hold dependency relationships and exclusion relationships for the tag information 114 and 124, and enable all tags required for the development of each asset to be derived on the basis of a combination of tags recorded in the asset A tag selection information 113 and 123. Details of the configurations of the software component trees 111 and 121 will be described below with reference to FIG. 3.

The tag selection information 113 and 123 is information recording a combination of tag information required for development of each asset among the tag information 114 and 124 included in the software component trees 111 and 121 for each asset. Furthermore, as will be described below, the tag selection information 113 and 123 of each asset also records tag information that is not shared with other assets. Details of the information recorded in the tag selection information 113 and 123 will be described below with reference to FIG. 4.

At the start of asset B development, when a developer of asset B selects tag information 114 for a plurality of assets A representing features required for asset B development from the asset A software component tree 111, the asset B software component tree 121 is built. At this time, a combination of tag information selected by the developer of asset B is recorded in the asset B tag selection information 123.

The tag information items 114a to 114d are an example of the tag information 114 included in the asset A software component tree 111. Among the tag information items 114a to 114*d*, the tag information items 114*a* and 114*b* indicate the tag information 114 of the asset A that exists at the start of development of the asset B, and the tag information 114*c* and 114*d* indicate the tag information 114 of the asset A that does not exist at the start of development of the asset B and is newly added to the asset A software component tree 111 by a subsequent update.

The tag information 114*a* is a tag T4 required for the development of the asset B, and indicates that the tag information 124*a* is mirrored in the asset B software component tree 121. On the other hand, the tag information 114*b* indicates that the tag T5 is not required by the asset B and is not included in the asset B software component tree 121.

The tag information item 114*c* indicates a tag T6 that is newly added in the development of the asset A after the asset B software component tree 121 is built and that needs to be newly added to the asset B as the tag information item 124*c*. The tag information 114*d* indicates a tag T7 that is newly added in the development of the asset A after the asset B software component tree 121 is built, but that is not shared with the asset B.

A person in charge of the update work 130 uses the software component update system 100 to indicate update information of the asset A to a user performing the work of mirroring the update information in the asset B.

Hereinafter, an outline of processing performed by the software component update system 100 will be described with reference to FIG. 1. Details of the processing performed by the software component update system 100 will be described below with reference to FIG. 6.

When mirroring the update information of the asset A in the asset B, the person in charge of the update work 130 inputs, to the software component update system 100, address information for specifying the asset A database 110, which is updated by the software component update system 100, and the asset B database 120, which is to serve as the update mirroring destination, via the operation interface 101 of the software component update system 100.

The component tree rebuilding unit 102 specifies the asset A database 110 and the asset B database 120 on the basis of the information inputted via the operation interface 101, acquires, from the database of each asset, the asset A software component tree 111, the tag selection information 113, and the asset B tag selection information 123, and rebuilds the asset B software component tree 121 on the basis of these information items.

The component extraction unit 103 specifies a software component group requiring update mirroring, on the basis of the software component tree rebuilt by the component tree rebuilding unit 102, and extracts a corresponding software component file from the asset A software component database 112.

The file update unit 104 checks for differences between the software component file extracted by the component extraction unit 103 and the corresponding software component file stored in the asset B software component database 122, and mirrors the update information.

Through the above processing, the update information is mirrored in the software components which need to be mirrored in the asset B database 120 among the software components updated in the asset A database 110.

Figure 2:
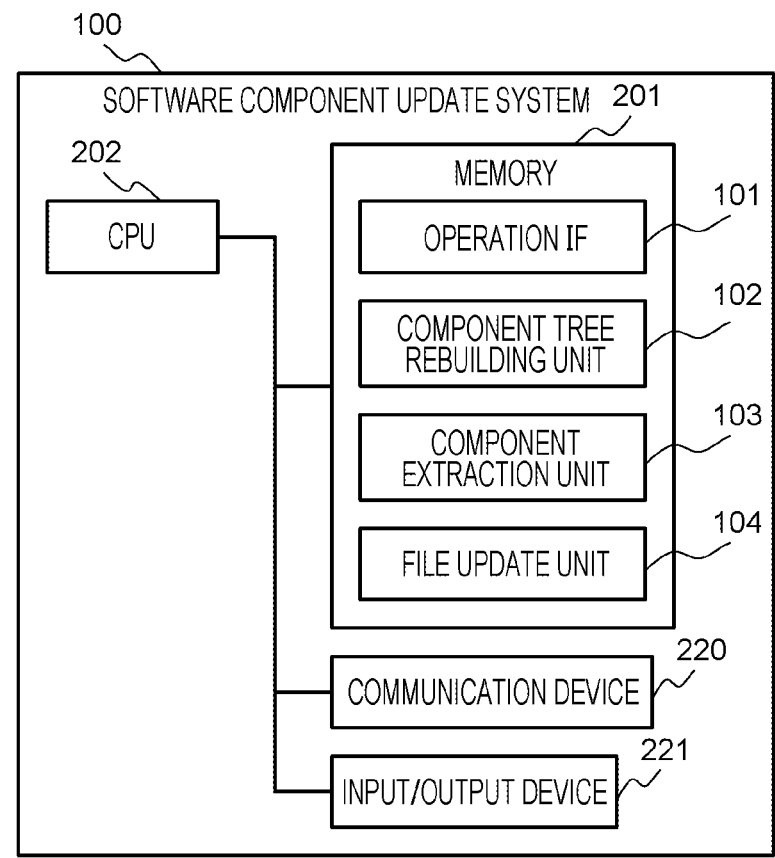
FIG. 2 is a block diagram illustrating a hardware configuration example of the software component update system according to the first embodiment.

FIG. 2 is a block diagram illustrating a hardware configuration example of the software component update system 100 in FIG. 1.

The software component update system 100 includes a CPU 202, a memory 201, and a communication device 220, and the processing units 101, 102, 103, and 104 illustrated in FIG. 1 are executed in each CPU.

The memory 201 includes a ROM which is a nonvolatile storage element and a RAM which is a volatile storage element. The ROM stores unchangeable programs (for example, BIOS) and the like. The RAM is a high-speed and volatile storage element such as a DRAM (Dynamic Random Access Memory), and temporarily stores programs executed by the CPU 202 and data used when the programs are executed.

The CPU 202 is an arithmetic device that executes the programs stored in the memory 201. Note that a portion of the processing performed by the CPU 202 executing the programs may also be executed by another arithmetic device (for example, hardware such as ASIC or an FPGA). The CPU 202 operates as a functional unit that provides predetermined functions by executing the programs of each functional unit.

In addition, the software component update system 100 includes a storage device (not illustrated). The storage device is, for example, a large-capacity, nonvolatile storage device such as a magnetic storage device (HDD) or a flash memory (SSD). The storage device stores data used when the CPU 202 executes the programs, and the programs executed by the CPU 202. That is, the functional units of the operation interface 101, the component tree rebuilding unit 102, the component extraction unit 103, and the file update unit 104 are loaded into the memory 201 as programs and executed by the CPU 202.

In addition, the software component update system 100 includes an input/output device 221. The input/output device 221 includes, for example, an input device such as a mouse, a keyboard, or a touch panel, and an output device such as a display. Note that another device, which is connected to the software component update system 100 via a network, may provide the input/output device 221.

The program executed by the processor 1 is provided to the software component update system 100 via a removable medium (CD-ROM, flash memory, or the like) or a network, and is stored in a nonvolatile storage device that is a non-transitory storage medium. Therefore, a renewable energy authentication management system may include an interface that reads data from a removable medium.

The software component update system 100 is a computer system configured physically on one computer or on a plurality of computers that are configured logically or physically, and may operate on a virtual computer built on a plurality of physical computer resources. For example, a program constituting the software component update system 100 may operate on separate physical or logical computers, or a plurality of such programs may be combined and operate on one physical or logical computer.

Figure 3:
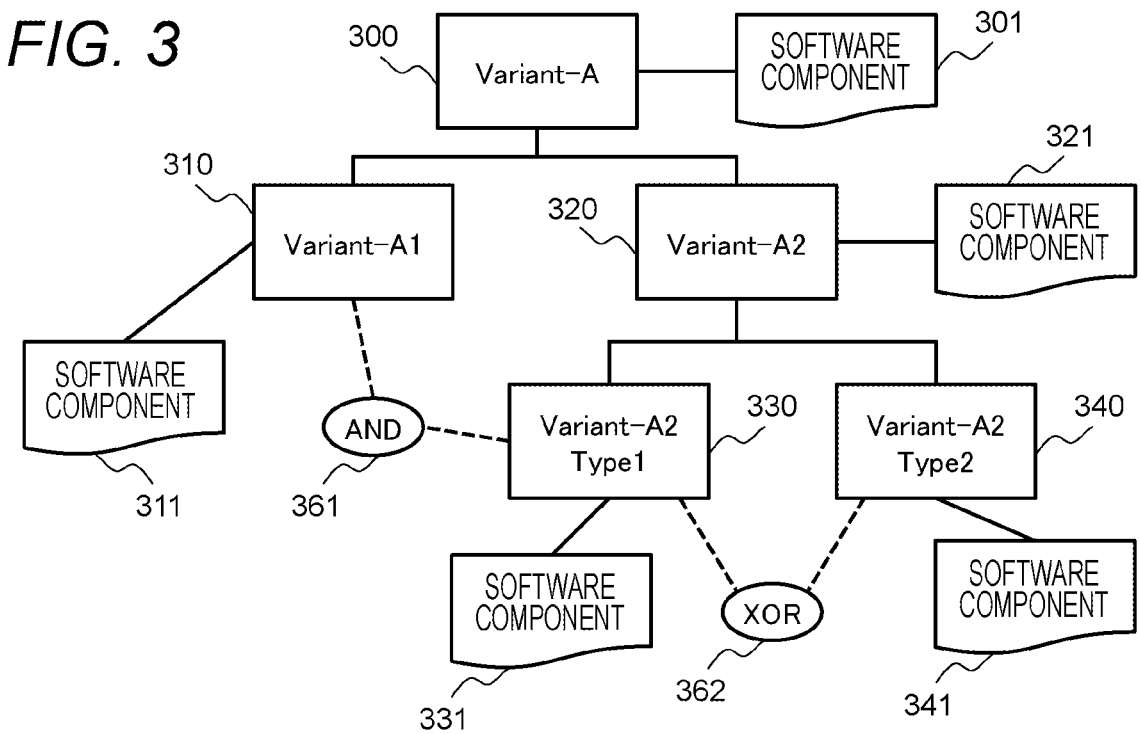
FIG. 3 is a diagram illustrating a configuration example of a software component tree according to the first embodiment.

FIG. 3 is a diagram illustrating a configuration example of software component trees 111 and 121 in FIG. 1.

The software component trees 111 and 121 have, as nodes constituting the trees, tag information 300, 310, 320, 330, and 340 indicating features of the software components.

Each tag information item is associated with a software component. For example, the tag information 300 is associated with a software component 301, and the tag information 310 is associated with a software component 311. Relational information linking the software component and the software component file may be included and managed in the software component tree as a portion of the tag information, or may be managed by separately creating a correspondence table.

In addition, the software component trees 111 and 121 have constraint information 361 and 362 representing dependency relationships and exclusion relationships of a plurality tag information items. When starting development on a new asset such as a new project or a product, it is possible to specify software components necessary for development on the basis of a hierarchical structure of the tag information, or constraint information, and to build a software component tree for the new asset by designating tag information matching a feature to be developed from a base software component tree.

For example, in a case where only the tag information 300 is selected, only the associated software component 301 can be reused.

Furthermore, for example, in a case where the tag information 310 is selected, in addition to the software component 311 associated with the tag information 310, the software component 301 associated with the higher-order tag information 300 of the tag information 310 is extracted as a software component having a dependency relationship. Further, the software component 331 associated with the tag information 330 having a dependency relationship with the tag information 310 is extracted according to the constraint information 361, and the software component 341 associated with the tag information 340 having an exclusive relationship is excluded according to the constraint information 362.

When newly adding a software component in the development process, a developer who changes the asset A database 110 of FIG. 1 adds tag information regarding the newly developed software component to the asset A software component tree 111, associates the tag information with the software component, and registers constraint information.

The software component update system 100 according to the present embodiment mirrors the update information of the asset A software component tree 111 in the asset B software component tree 121 by means of processing which will be described below with reference to FIG. 6.

Figures 4, 5:
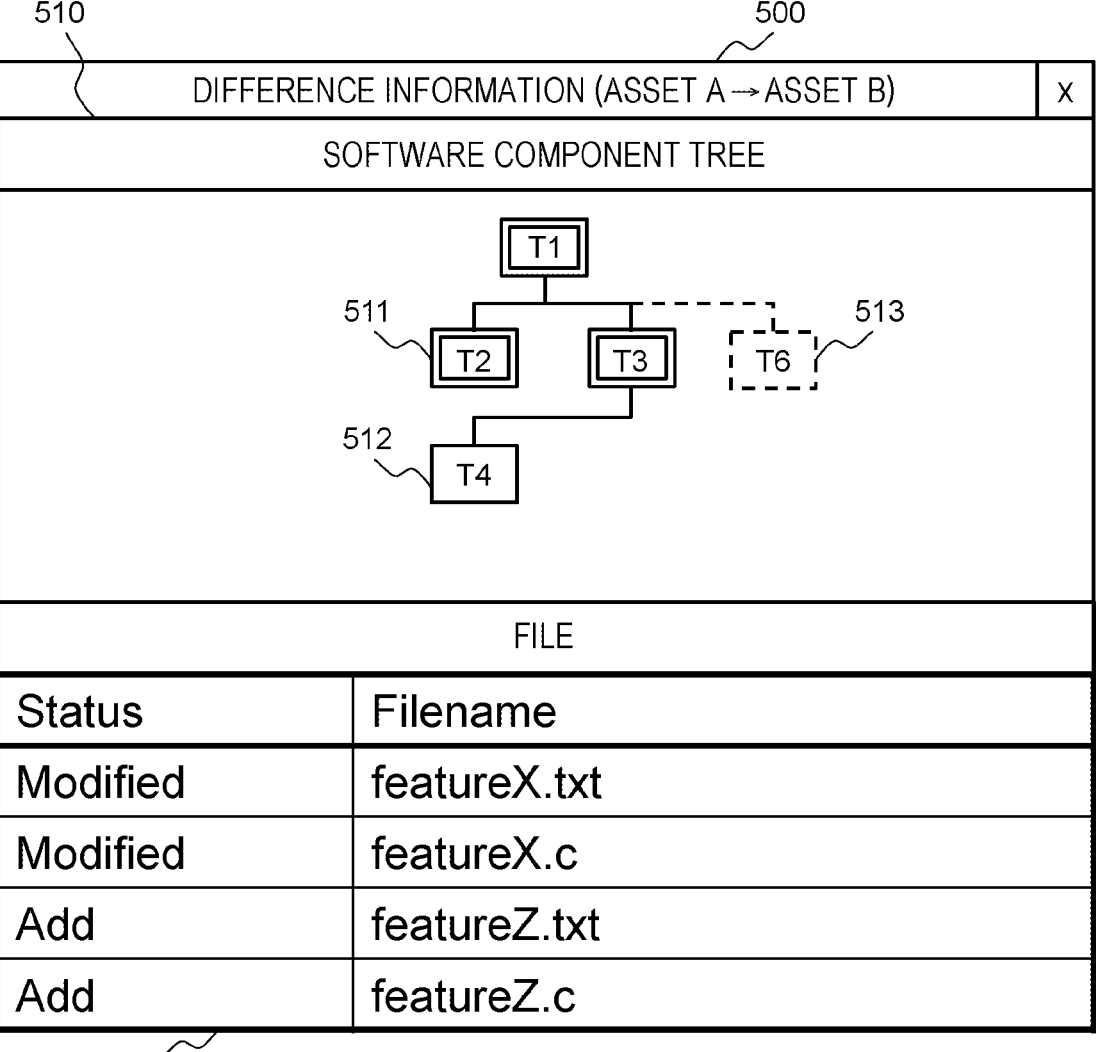
FIG. 4 is a diagram illustrating a configuration example of tag selection information according to the first embodiment.
FIG. 5 is a diagram illustrating an example of a screen for displaying difference information when a software component tree according to a second embodiment is to be updated.

FIG. 4 is a diagram illustrating a configuration example of tag selection information 113 and 123 in FIG. 1.

The tag selection information 113 and 123 are information on the tag usage status in the asset databases 110 and 120 in which the tag selection information 113 and 123 are stored, for the tag information included in the software component trees 111 and 121.

The table in FIG. 4 shows relationships between tag types, target assets, and tags recorded as the tag selection information 113 and 123.

In the tag selection information 113 and 123, the tag type designates a selection tag or a non-sharing tag according to the usage method of the tag to be recorded. The target asset records information indicating an asset which is a target for not sharing a specific tag, only in a case where the tag type is a non-sharing tag.

In a case where the tag type is a selection tag, a combination of tag information selected by the developer at the start of asset development among the tag information included in the software component trees 111 and 121 is recorded in the tag.

Furthermore, in a case where the tag type is a non-sharing tag, a list of tag information which is not to be shared with the target asset is recorded in the tag.

In addition to recording the tag information as is, a regular expression representing specific tag information may be recorded in the tag.

As will be described below, the software component update system 100 according to the present embodiment deletes unnecessary tag information 114 from the asset A software component tree 111 on the basis of the tag selection information 113 and 123, and rebuilds the asset B software component tree 121 which is the update destination. As a result, software components requiring update mirroring in the asset B database 120 can be specified from the rebuilt software component tree.

An example of the processing flow of the first embodiment will be described with reference to FIG. 6.

The software component update system 100 receives an input of address information for specifying the updated asset A database 110 and address information for specifying the asset B database 120 which is the update mirroring destination, via the operation interface 101 of the person in charge of the update work 130.

The software component update system 100 starts the update processing with the input by the person in charge of the update work 130 serving as a trigger, and executes the processing of step S600.

In step S600, the component tree rebuilding unit 102 copies the information of the asset A software component tree 111 on the basis of the address information specifying each of the asset databases 110 and 120 inputted by the person in charge of the update work 130, and creates a software component tree 611 for rebuilding work.

In step S601, after acquiring the asset A tag selection information 113 from the asset A database 110, the component tree rebuilding unit 102 acquires a list of tags which are not to be shared with the asset B from the asset A tag selection information 113, by using the tag type "non-sharing tag" and the target asset "asset B" as search keys. Thereafter, the component tree rebuilding unit 102 deletes tag information that matches the tags disclosed in the list of tags which are not to be shared with the asset B, from among the tag information 114 included in the software component tree 611 for rebuilding work. At this time, child nodes associated with the tag information to be deleted are also deleted.

In step S602, after acquiring the asset B tag selection information 123 from the asset B database 120, the component tree rebuilding unit 102 acquires, from the asset B tag selection information 123, a combination of tags selected by the developer in building the asset B software component tree 121, by using the tag type "selection tag" as a search key. Thereafter, the component tree rebuilding unit 102 specifies tag information that can be derived from the acquired combination of tags among the tag information 114 on the basis of the constraint information 361 and 362 included in the software component tree 611 for the rebuilding work, deletes the other tag information, and creates a rebuilt software component tree 614. At this time, similarly to step S601, the child nodes associated with the tag information to be deleted are also deleted. The component tree rebuilding unit 102 then outputs the rebuilt software component tree 614 to the component extraction unit 103.

In step S603, the component extraction unit 103 receives the rebuilt software component tree 614 from the component tree rebuilding unit 102, and outputs, as a software component 615 to be updated, a list of software components associated with the tag information included in the software component tree 614.

In step S604, the component extraction unit 103 extracts a software component file 616 to be updated from the asset A software component database 112 on the basis of the software component 615 to be updated, and outputs the rebuilt software component tree 614 and a software component file 616 to be updated to the file update unit 104.

In step S605, the file update unit 104 receives, from the component extraction unit 103, the rebuilt software component tree 614 and the software component file 616 to be updated, and merges the rebuilt software component tree 614 with the asset B software component tree 121. In addition, the file update unit 104 merges the software component file 616 to be updated with the software component file included in the asset B software component database 122. The update is accordingly mirrored.

Update conflicts are taken into account at the time of merging, and in cases where a conflict occurs, the merge is not performed, and the person in charge of the update work 130 is notified of the conflict via the operation interface 101.

The update processing by the software component update system 100 ends as described above, and the update information on the software components requiring mirroring in the asset B database 120 among the software components updated in the asset A database 110 is mirrored.

According to the present embodiment, when the software components included in the software component tree 111 included in the asset A database 110 and the software components included in the asset A database 110 are updated, the software component update system 100 is capable of specifying software component groups requiring update mirroring in the asset B from among the software components updated in the asset A and of mirroring the software component update information in the asset B software component database 122 included in the asset B database 120. Therefore, even in a case where software component groups having different sharing ranges are to be managed, the configuration management of the software components and the update mirroring work to a plurality of projects and product groups can be made efficient.

Second Embodiment

A second embodiment will be described with reference to FIG. 5. In the second embodiment, when the file update unit 104 of the software component update system 100 mirrors the updating of the software component tree and the software components in step S605 of FIG. 6, processing different from that of the first embodiment is performed. Other configurations and processing are the same as those of the first embodiment, and thus descriptions thereof are omitted.

In the present embodiment, when the software component update system 100 mirrors the update information in the asset B database 120, by visually presenting difference information of the asset B software component tree 121 and difference information of the asset B software component database 122 before and after the update to the person in charge of the update work 130, the person in charge of the update work 130 is able to efficiently grasp the content of the software component update and select the update information which is to be mirrored according to development requirements.

FIG. 5 is a diagram illustrating an example of a screen for displaying the difference information when the file update unit 104 according to the present embodiment updates a software component tree.

The file update unit 104 according to the present embodiment merges the software component tree 614 rebuilt in step S605 of FIG. 6, and displays a difference information display screen 500 before merging the software component file 616 to be updated into the asset B database 120.

For example, the file update unit 104 generates data for displaying, on the difference information display screen 500, the name of the asset A for which software components have been updated, the name of the asset B in which the update is to be mirrored, software component tree difference information 510, and software component file difference information 520.

The software component tree difference information 510 is an example obtained by visualizing difference information for differences in the tag information 124 between the rebuilt software component tree 614 and the asset B software component tree 121. The tag difference information 511 represents tag information which has not been updated among the asset B tag information 124. The tag update display 512 indicates that, among the tag information 124 included in both the asset A and the asset B, the software components associated with the corresponding tag information are being changed by the development of the asset A, and that the update is to be mirrored in the asset B database 120. The tag update display 513 indicates tag information newly added to the asset B database 120 among tag information newly added to the asset A software component tree 111.

The software component file difference information 520 displays, in table format, difference information between the software component file 616 to be updated and the software component file included in the asset B software component database 122. At this time, a combination of the name (filename) of the software component file being updated and the update status (Status) is displayed. As the update status (Status), add (Add), modify (Modified), delete (Delete), and so forth are displayed according to the file update status.

The person in charge of the update work 130 is able to edit the content of changes to the asset B software component tree 121 and the software component files via a file explorer or the like by referring to the information displayed on the difference information display screen 500.

According to the present embodiment, when mirroring update information in the asset B database 120, the software component update system 100 visually presents difference information of the asset B software component tree 121 and the asset B software component database 122 before and after the update to the person in charge of the update work 130, and thus the person in charge of the update work 130 is able to efficiently grasp the software component update content.

With the software component update system 100 according to the present embodiment, it is possible to grasp the impact of the update work on the software components and proceed with the development work. In addition, software components which are to be updated can be selected according to the project requirements.

As described above, the software component update system 100 according to an embodiment of the present invention is connected to a first database (the asset A database 110) and a second database (the asset B database 120) that store the software component tree information 111 and 121 representing a plurality of software components in a tree format, the tag information representing respective attributes of the software components, and the software component file (software component databases 112 and 122) that includes the design information and the source code constituting the software components, the software component update system 100 including the component tree rebuilding unit 102 that rebuilds a software component tree of the second database 120 on the basis of the tag information and the software component tree information 111 of the first database 110; a component extraction unit 103 that specifies software components of the second database 120 requiring update mirroring, on the basis of the rebuilt software component tree; and a file update unit 104 that updates the software component file of the specified software component file. Even in a case where there are software components having different sharing ranges, the software component update information can be mirrored in the databases of other projects or product groups according to the sharing ranges of the software components. Furthermore, the update information can be mirrored in the software component tree of each asset, and the configuration management of the software components and the update mirroring work to a plurality of projects and product groups can be made efficient.

In addition, the first database 110 and the second database 120 store tag selection information 113 and 123 in which a combination of tag information for specifying software components to be managed is recorded, and the component tree rebuilding unit 102 rebuilds the software component tree of the second database 120 on the basis of the tag selection information 113, the tag information, and the software component tree information 111 of the first database 110. Therefore, it is possible to delete components that are not to be mirrored in the software component tree of the second database 120, to specify required updates in the software component tree of the second database 120, and to accurately select components to be mirrored in the software component tree of the second database 120.

Because the file update unit 104 generates display data for displaying, on the screen, the software component tree information and difference information for before and after the software component update, system operations can be presented to the user, and the updated files can be displayed in an easy-to-understand manner.

Note that the present invention is not limited to or by the above-described embodiments, and includes various modifications and equivalent configurations within the spirit of the appended claims. For example, the above-described embodiments have been described in detail to facilitate understanding of the present invention, and the present invention is not necessarily limited to or by embodiments having all the configurations described. Further, a portion of the configuration of a certain embodiment may be replaced with the configuration of another embodiment. In addition, the configuration of another embodiment may be added to the configuration of a certain embodiment. Moreover, it is possible to add other configurations to a portion of the configurations of each embodiment, or to delete or replace a portion of the configurations of each embodiment.

In addition, some or all of the above-described configurations, functions, processing units, processing means, and the like, may be realized by hardware by, for example, a design using an integrated circuit, or may be realized by software as a result of a processor interpreting and executing programs for realizing each function.

Information such as a programs, tables, and files for realizing each function can be stored in a recording device such as a memory, a hard disk, or a solid state drive (SSD), or on a recording medium such as an IC card, an SD card, or a DVD.

Moreover, control lines and information lines that are considered necessary for the sake of the description are illustrated, and not all control lines and information lines required for implementation are illustrated. In practice, almost all the configurations may be considered to be interconnected.

The invention claimed is:

1. A software component update system configured by a computer including a processor and a memory, the computer connected to a first database and a second database that store software component tree information representing a plurality of software components in a tree format, tag information representing respective attributes of the software components, and a software component file including design information and a source code that constitute the software components, the software component update system including:

a component tree rebuilder configured to rebuild rebuilding unit that rebuilds a software component tree of the second database based on the tag information, tag selection information defining sharing tags and non-sharing tags, and the software component tree information of the first database, the software component tree information defining constraint information associated with the tag information;

a component extractor configured to specify the software components of the second database requiring update mirroring, based on the rebuilt software component tree; and a file updater configured to update the software component file of the specified software components.

2. The software component update system according to claim 1, wherein each of the first database and the second database store tag selection information in which a combination of the tag information for specifying software components to be managed is recorded.

3. The software component update system according to claim 1, wherein the file updater is configured to generate display data for displaying, on a screen, the software component tree information and difference information for before and after the software component update.

4. A software component update method executed by a computer including a processor and a memory, wherein the computer is connected to a first database and a second database that store software component tree information representing a plurality of software components in a tree format, tag information representing respective attributes of the software components, and a software component file including design information and a source code that constitute the software components, the software component update method including:

rebuilding, by a component tree rebuilder, the software component tree of the second database based on the tag information, tag selection information defining sharing tags and non-sharing tags, and the software component tree information of the first database, the software component tree information defining constraint information associated with the tag information;

specifying, by a component extractor, the software components of the second database requiring update mirroring, based on the rebuilt software component tree; and updating, by a file updater, the software component file of the specified software components.

5. The software component update method according to claim 4, wherein each of the first database and the second database store tag selection information in which a combination of the tag information for specifying software components to be managed is recorded.

6. The software component update method according to claim 4, further comprising:

generating, by the file updater, display data for displaying, on a screen, the software component tree information and difference information for before and after the software component update.

\* \* \* \* \*